July 26, 1949.                L. THOMPSON ET AL                    2,477,099
                    LIGHT CHANGING SYSTEM FOR MOTION-PICTURE
                                 PRINTING MACHINES
                              Filed May 20, 1948
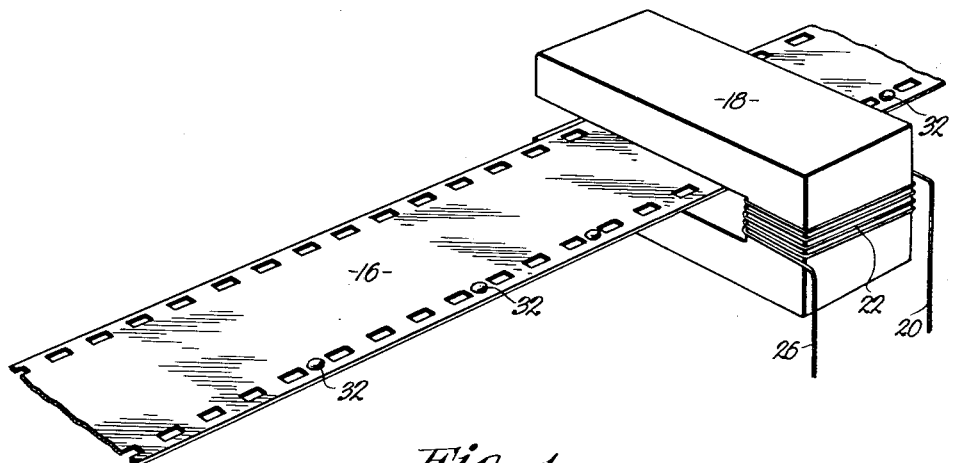
Fig. 1.
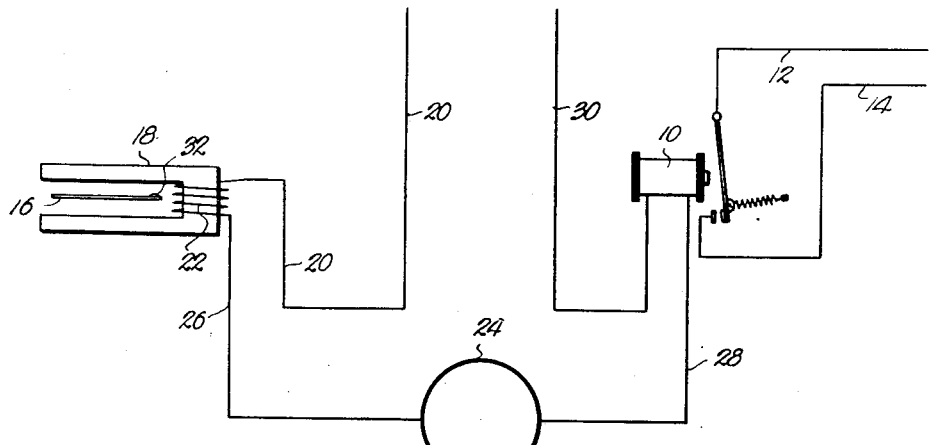
Fig. 2.    Amplifying Tube
INVENTORS.
Lloyd Thompson
Allen Jacobs
BY
                        ATTORNEY.

Patented July 26, 1949

2,477,099

UNITED STATES PATENT OFFICE 2,477,099

LIGHT CHANGING SYSTEM FOR MOTION-PICTURE PRINTING MACHINES

Lloyd Thompson and Allen Jacobs, Kansas City, Mo., assignors to The Calvin Company, Kansas City, Mo., a corporation of Missouri Application May 20, 1948, Serial No. 28,136

1 Claim. (Cl. 175—183)

This invention relates to the printing of photographic films chiefly of the class used for cinematographic purposes, the primary object being to provide novel means for controlling changes in intensity of the printing light through movement of the film through such machine.

Many different methods have heretofore been utilized to accomplish the purposes of this invention, the most common being to notch an edge of the film. In so doing, notches are formed in the film designed to actuate elements that in turn control apparatus for determining the intensity of the printing light.

Another expedient is to use metallic contact clips. These clips are fastened to the film in various fashions, the usual means being to place the ends of the clips through certain of the perforations adjacent the edges of the film and rebending the same on the opposite face of the film.

Notching or mutilation of the film or attachment of the clips thereto obviously weakens the film and oftentimes causes breakage. Moreover, reprinting of a large number of positive films from a single negative requires precise synchronization and any method used which will tend to damage the film or the perforations therein will seriously affect subsequent printing.

In the case of notching, or in the case of the clips, use of the film on different machines is hampered. Once notched, the film cannot be used on another machine requiring different spacing between the notches. And, removal of clips for repositioning ordinarily damages the film beyond further use.

The most important object of this invention is to supplement the clip or notch method of effecting light changes by applying "gobs" of paint, spaced along one face of the film, said paint being provided with a substance in the form of a metallic powder, which "gobs" of paint may be easily removed from the film if desired without damaging effect thereto.

Another important object of this invention is to provide a light changing system for motion picture printing machines having a circuit and a magnet interposed in the circuit, said magnet being provided with a pair of spaced apart opposed poles, between which poles the film is advanced to the end that the aforesaid units of magnetic material will vary the magnetic reluctance in the field of said magnet and in said circuit whereby to control electrical structure having connection with the light changing apparatus.

One way in which the aforesaid objects are accomplished, is illustrated in the accompanying drawing, wherein:

Fig. 1 is a fragmentary perspective view showing schematically a film having "gobs" of metallic paint applied thereto, said film being operably associated with a magnet; and Fig. 2 is a schematic wiring diagram showing the way in which the magnet and its field is electrically connected to the control means for the light changing apparatus.

It is well known by those skilled in the art that the usual type of automatic photograph printing machine is provided with mechanism for determining the intensity of the printing light. A number of different methods may be used for controlling the operation of such mechanism such as a relay 10 illustrated in Fig. 2 and having electrical connection with the light changing mechanism through a pair of lead lines 12 and 14.

The structure about to be described is designed to control the operation of this relay 10. The master film from which a number of reprints are made in such automatic printing machines is broadly designated by the numeral 16. This film 16 is advanced through the machine as printing takes place for unwinding and rewinding respectively, all of which structure forms no part of this invention and therefore, has not been shown.

A magnet 18 is formed in any suitable manner to embrace the advancing film 16, the form thereof chosen for illustration being U-shaped. Magnet 18 is provided with a pair of opposed poles one on each side of the film 16 in the usual manner. This magnet 18 is interposed in a circuit including a lead line 20 extending from a suitable source of electrical energy and having connection with a field winding 22 for the magnet 18. The opposite end of this winding 22 has connection with a suitable amplifying tube 24 through conductor 26. Current emanating from the field winding 22 is amplified by the tube 24 and transmitted to the relay 10 by a wire 28. The circuit is completed by lead line 30 connecting relay 10 with said source of electrical energy.

Operation of the tube 24 which in turn operates the relay 10, is affected by varying the reluctance within the circuit having field 22 interposed therein and such variance of the magnetic reluctance of field 22 is accomplished by a plurality of spaced units 32 applied to one face of the film 16. These units 32 consist of a "gob" of metallic paint which consists of a metal powder mixed with a suitable base material or binder capable of adhering to the film 16. The powdered magnetic material within the units 32 will pass between the poles of magnet 18 to vary the reluctance of the magnetic circuit and thereby create a change in the magnetic field 22 which will be amplified by tube 24 and the output of this tube 24 will operate the relay 10.

The base material from which the units 32 are made may consist of any suitable substance capable of application as a paint. The magnetic qualities of these units may be created by use of metallic powder or any magnetic substance which will readily admix with a suitable base.

It is clear that the size of each of the individual units 32 may be predetermined by selecting the degree of reluctance change necessary to energize the amplifying tube 24. This also may be predetermined by varying the amount of metallic substance within each of the units 32. Therefore, if it becomes necessary or desirable to make additional prints from the master film 16 in machines wherein the spacing between units differs, these units 32 may be easily removed and new units applied to film 16 at the proper distance.

Obviously, with a predetermined amount of metallic material necessary in each of the units 32 to affect the magnet 18, it will not be necessary to entirely remove the units 32 during such change of machines.

In other words, the greater portion of the units 32 may be removed without damage to the film 16 and that part thereof which remains on film 16 will have no effect upon the magnet 18 in successive machines utilized.

Obviously, "gobs" of substances as above set forth may be utilized for many purposes other than that mentioned hereinabove. The response of our electronic device to passage of the "gob" or "gobs" of paint-like material may be used to operate many types of impulse controlled circuit, which in turn can perform varied functions.

With respect to photography, it may be used to operate a light-changing device for printing; to trip devices for starting other equipment; to actuate apparatus for indicating visually or audibly when a given point on the film is reached; control filter changes in color printing; and control of optical effects in either color or black-white printing.

Blobs of the permeable paint may be applied to cloth in rolls, to paper in rolls such as ticker tapes, and to alter spools or rolls of material having no permeable characteristics. Cards, paper and plastic sheets of material, rods and slabs could be so treated to indicate their passing a given point, as well as their speed of travel. Other applications are to rolls of twine, thread, rope and non-permeable wire, such as copper.

In addition to the reluctance type control, as above set forth, slight changes could easily be made to use such patches of permeable paint to present an inductive type control. In such device, three coils could be used, the two outermost coils being wound to be normally out of phase whereby no current is induced in the center coil. Thus, when a gob of metallic paint passes through a gap in one of the outer coils, an unbalance is effected to induce a voltage in the center coil.

A capacitive method would involve the use of metallic elements operable to change the capacity of an electronic oscillating circuit, for example. The change could operate a triggering circuit to accomplish the result desired.

And, conversely, dia-magnetic materials could be used in both the reluctance and the inductive systems. Many dyes and gases have such characteristics and are readily obtainable upon the open market.

It is clear from the foregoing that all of the disadvantages present in the common methods for effecting light changes in motion picture printing machines are obviated by the method and means employed by this invention. Many advantages arising from the use of such metallic "gobs" of paint taken with the two pole magnet and amplifying circuit will become apparent to those skilled in the art.

Such "gobs" of paint may also be used on the opposite edge of the film for other control devices, such as automatic "fade in" or "fade out," or color connecting filters.

Having thus described the invention, what is claimed as new and desired to be secured by Letters Patent is:

In a machine for printing motion picture films having apparatus including an electric circuit and adapted for operation upon predetermined variances in the reluctance of said circuit; the improvement of which comprises a continuous film strip having a plurality of equally spaced, metallic units on one face thereof throughout its length, said units having like degrees of permeance; and a magnet having opposed poles disposed on opposite sides of the film strip and a pick-up coil coupled in said circuit, said units being arranged to pass between the poles of said magnet as the film is advanced.

LLOYD THOMPSON.
ALLEN JACOBS.

REFERENCES CITED

The following references are of record in the file of this patent:

UNITED STATES PATENTS

| Number | Name | Date |
| --- | --- | --- |
| 1,897,731 | Manegold | Feb. 14, 1933 |
| 1,906,820 | Shaw | May 2, 1933 |
| 2,150,440 | Hargreaves | Mar. 14, 1939 |